United States Patent
Kim

(10) Patent No.: US 9,939,903 B2
(45) Date of Patent: Apr. 10, 2018

(54) DISPLAY DEVICE AND CONTROL METHOD THEREOF

(71) Applicant: LG Electronics Inc., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/152,294

(22) Filed: May 11, 2016

(65) Prior Publication Data

US 2016/0252960 A1  Sep. 1, 2016

Related U.S. Application Data

(63) Continuation of application No. 14/204,817, filed on Mar. 11, 2014, now Pat. No. 9,367,134, which is a (Continued)

(30) Foreign Application Priority Data

Sep. 28, 2012 (KR) ......................... 10-2012-0108823

(51) Int. Cl.
*G06F 3/041* (2006.01)
*G06F 3/01* (2006.01)
*G06F 3/0488* (2013.01)

(52) U.S. Cl.
CPC .............. *G06F 3/016* (2013.01); *G06F 3/041* (2013.01); *G06F 3/0414* (2013.01);
(Continued)

(58) Field of Classification Search
CPC ...... G06F 3/041; G06F 3/0416; G06F 3/0412; G06F 3/048
See application file for complete search history.

(56) References Cited

U.S. PATENT DOCUMENTS 6,084,587 A   7/2000 Tarr et al.
6,125,385 A   9/2000 Wies et al.
(Continued)

FOREIGN PATENT DOCUMENTS

CN        101533330 A    9/2009
EP        2 101 247 A2   9/2009
WO    WO 2011/046714 A1  4/2011

*Primary Examiner* — Olga Merkoulova
(74) *Attorney, Agent, or Firm* — Birch, Stewart, Kolasch & Birch, LLP

(57) ABSTRACT

A display device and method for controlling the display device are discussed. The display device can include a display unit for displaying a first object and a second object on a display screen, a tactile feedback unit for generating tactile feedback on the display screen; and a controller configured to generate a first tactile feedback according to properties of the first object while a first touch input is detected in a first region where the first object is displayed, generate a second tactile feedback according to properties of the second object while a second touch input is detected in a second region where the second object is displayed, detect a pressure of the first touch input or the second touch input, and adjust the intensity of the first tactile feedback or the second tactile feedback according to the detected pressure of the first touch input or the second touch input.

8 Claims, 10 Drawing Sheets visual user interface tactile user interface

Related U.S. Application Data continuation of application No. 13/857,831, filed on Apr. 5, 2013, now Pat. No. 8,743,072, which is a continuation-in-part of application No. 13/679,582, filed on Nov. 16, 2012, now Pat. No. 8,451,248.

(52) U.S. Cl.
CPC .......... *G06F 3/0416* (2013.01); *G06F 3/0488* (2013.01); *G06F 3/04883* (2013.01); *G06F 2203/04808* (2013.01)

(56) References Cited

U.S. PATENT DOCUMENTS

| | | | |
|---|---|---|---|
| 6,647,145 B1* | 11/2003 | Gay | G06F 3/03545 178/18.01 |
| 7,509,588 B2 | 3/2009 | Van Os et al. | |
| 7,956,847 B2 | 6/2011 | Christie | |
| 2005/0151720 A1* | 7/2005 | Cruz-Hernandez | G06F 3/016 345/156 |
| 2006/0026535 A1 | 2/2006 | Hotelling et al. | |
| 2008/0170118 A1* | 7/2008 | Albertson | A61H 3/061 348/46 |
| 2009/0079550 A1 | 3/2009 | Makinen et al. | |
| 2009/0109007 A1 | 4/2009 | Makinen et al. | |
| 2009/0135164 A1 | 5/2009 | Kyung et al. | |
| 2009/0167509 A1 | 7/2009 | Fadell et al. | |
| 2009/0167704 A1 | 7/2009 | Terlizzi et al. | |
| 2010/0039403 A1 | 2/2010 | Schroeder | |
| 2010/0141411 A1 | 6/2010 | Ahn et al. | |
| 2010/0231367 A1 | 9/2010 | Cruz-Hernandez et al. | |
| 2010/0267424 A1 | 10/2010 | Kim et al. | |
| 2010/0277429 A1 | 11/2010 | Day et al. | |
| 2011/0018695 A1 | 1/2011 | Bells et al. | |
| 2011/0057880 A1* | 3/2011 | Kasahara | G06F 1/1626 345/158 |
| 2011/0179388 A1 | 7/2011 | Fleizach et al. | |
| 2011/0264491 A1 | 10/2011 | Birnbaum et al. | |
| 2011/0291821 A1 | 12/2011 | Chung | |
| 2012/0154328 A1* | 6/2012 | Kono | G06F 3/016 345/174 |
| 2012/0235942 A1 | 9/2012 | Shahoian et al. | |
| 2012/0327006 A1 | 12/2012 | Israr et al. | |
| 2013/0009892 A1* | 1/2013 | Salmela | G06F 3/016 345/173 |
| 2014/0049483 A1* | 2/2014 | Kim | G06F 3/04812 345/173 |

\* cited by examiner visual user interface tactile user interface visual user interface tactile user interface visual user interface tactile user interface visual user interface              tactile user interface

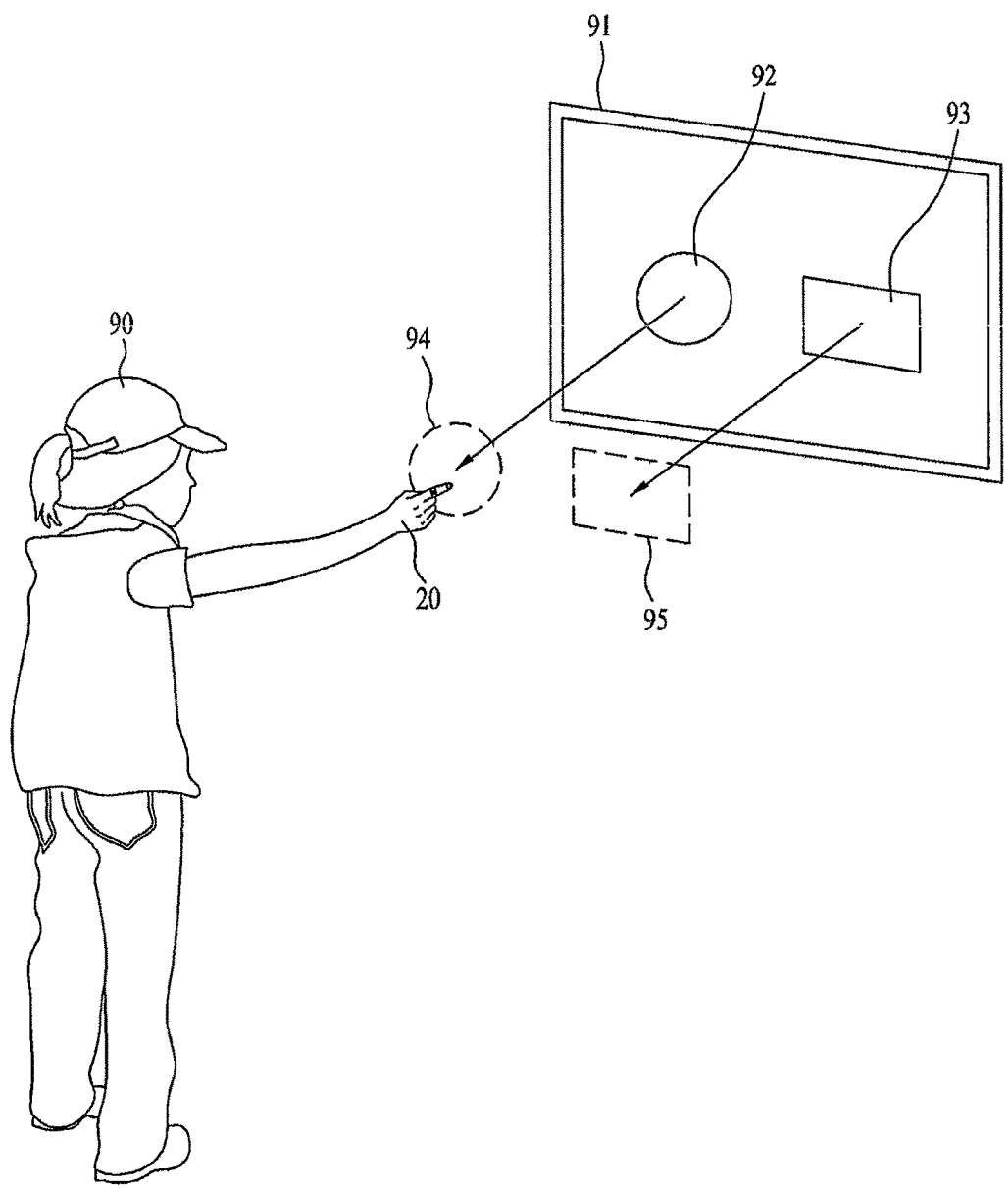

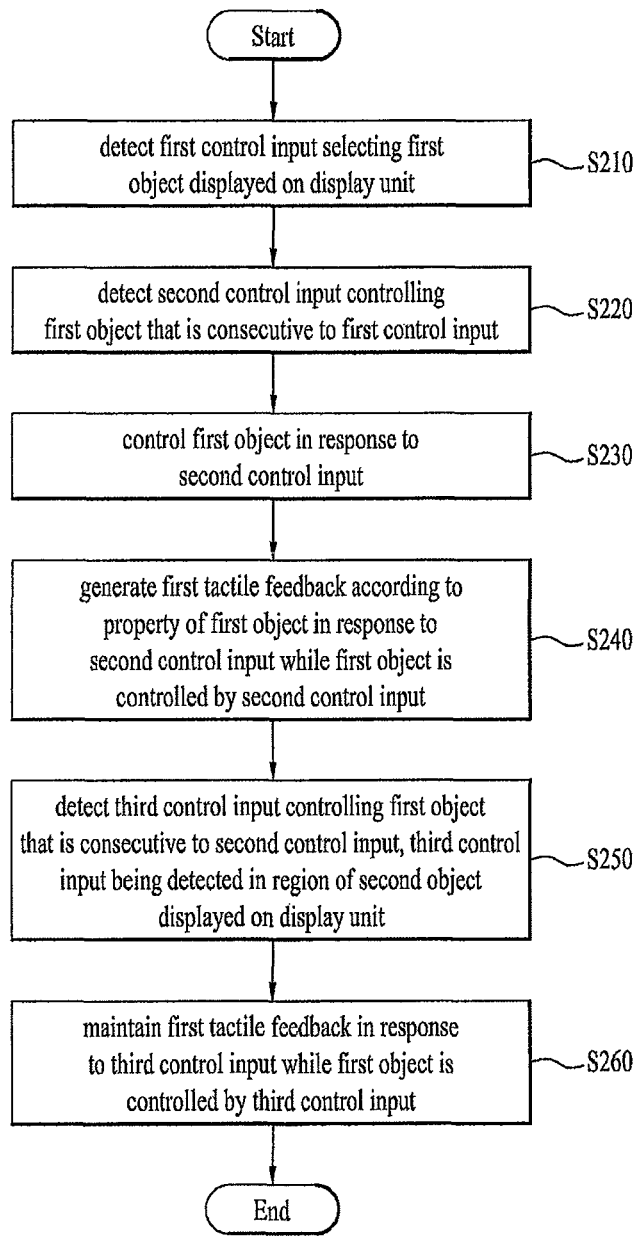

DISPLAY DEVICE AND CONTROL METHOD THEREOF

CROSS-REFERENCE TO RELATED APPLICATIONS

This application is a Continuation of co-pending U.S. application Ser. No. 14/204,817 filed on Mar. 11, 2014, which is a Continuation of U.S. patent application Ser. No. 13/857,831 filed on Apr. 5, 2013 (now U.S. Pat. No. 8,743,072), which is a Continuation-in-Part of U.S. application Ser. No. 13/679,582 filed on Nov. 16, 2012 (now U.S. Pat. No. 8,451,248), which claims priority to Application No. 10-2012-0108823, filed in the Republic of Korea on Sep. 28, 2012. The entire contents of all of the above applications are hereby expressly incorporated by reference into the present application.

BACKGROUND OF THE INVENTION

Field of the Invention

The present specification relates to a display device, and more particularly to a display device capable of providing a user with tactile feedback using a tactile user interface and a control method thereof.

Discussion of the Related Art

A display device may provide a user with a user interface for control of an electronic appliance. Through use of the display device, the user can control the electronic appliance by visually confirming an operational state of the electronic appliance. A recent display device is capable of receiving a control command of a user by detecting a user touch gesture via a touch sensitive function. This allows the user to control an electronic appliance by directly touching the digital device without using input tools, such as a keyboard, mouse, etc. Such a display device may provide the user with a variety of user interfaces, examples of which may include a visual user interface and a tactile user interface. A conventional tactile user interface usable with the display device functions to generate only constant tactile feedback regardless of a control operation of the user, and thus has difficulty in adaptively responding to the control operation of the user.

SUMMARY OF THE INVENTION

Accordingly, the present specification is directed to a display device and a control method thereof that substantially obviate one or more problems due to limitations and disadvantages of the related art.

An object of the present specification is to provide a display device which provides a tactile user interface capable of adaptively generating tactile feedback in response to a control operation of a user.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device includes a touch sensitive display unit configured to display an object, a tactile feedback unit configured to generate tactile feedback, and a controller configured to control the other units, wherein the controller is configured to detect a first touch that is in contact with a region of a first object displayed on the display unit, detect a second touch controlling the first object that is consecutive to the first touch, control the first object in response to the second touch, generate first tactile feedback according to properties of the first object in response to the second touch in a controlled state of the first object, detect a third touch controlling the first object that is consecutive to the second touch, wherein the third touch is detected in a region of a second object displayed on the display unit, and generate the first tactile feedback in response to the third touch in a controlled state of the first object.

In accordance with another aspect of the present specification, a method of controlling a touch sensitive display device, includes detecting a first touch of touching a region of a first object displayed on the display unit, detecting a second touch controlling the first object that is consecutive to the first touch, controlling the first object in response to the second touch, generating first tactile feedback according to properties of the first object in response to the second touch in a controlled state of the first object, detecting a third touch controlling the first object that is consecutive to the second touch, wherein the third touch is detected in a region of a second object displayed on the display unit, and generating the first tactile feedback in response to the third touch in a controlled state of the first object.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 9 is a view illustrating a method of providing remote tactile feedback in response to a non-contacting control input controlling an object according to another embodiment of the present specification; and FIG. 10 is a view illustrating a method of providing continuous tactile feedback in response to a control input controlling an object according to another embodiment of the present specification.

DETAILED DESCRIPTION OF THE INVENTION

Hereinafter, the embodiments of the present specification will be described in detail with reference to illustrations and descriptions of the accompanying drawings, but the present specification is not limited or restricted by these embodiments.

Although the terms used in the following description are selected, as much as possible, from general terms that are widely used at present while taking into consideration the functions obtained in accordance with the present specification, these terms may be replaced by other terms based on intensions of those skilled in the art, customs, emergence of new technologies, or the like. Also, in a particular case, terms that are arbitrarily selected by the applicant of the present specification may be used. In this case, the meanings of these terms may be described in corresponding description parts of the specification. Accordingly, it should be noted that the terms used herein should be construed based on practical meanings thereof and the whole content of this specification, rather than being simply construed based on names of the terms.

In the present specification, a display device may be an electronic appliance that includes a display unit and a tactile feedback unit and provides a user with a visual user interface and a tactile user interface. The display device may include an electronic appliance having a display unit, such as a smart phone, Personal Digital Assistant (PDA), cellular phone, MP3 music player, laptop computer, smart pad, tablet Personal Computer (PC), television, and smart table, for example. The display device according to the present specification may transmit information to the user using the visual user interface and the tactile user interface. The visual user interface may provide the user with visual feedback using the display unit of the display device. The user can visually confirm information provided from the display device, and control the display device. The tactile user interface may provide the user with tactile feedback using the tactile feedback unit of the display device. The user can confirm information provided from the display device via particular parts of the body that can perceive tactile sensation, such as the finger, etc., and control the display device. The visual user interface and the tactile user interface may be separately provided, or may be simultaneously provided.

Figure 1:
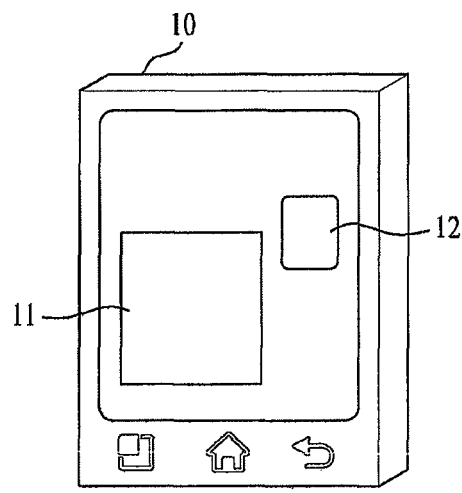
FIG. 1 is a view illustrating a visual user interface and a tactile user interface according to an embodiment of the present specification.
Figure 1:
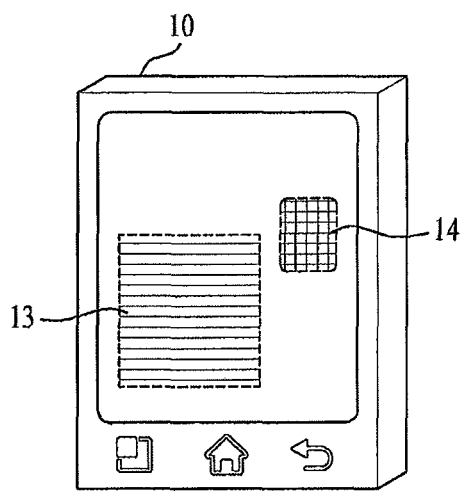

FIG. 1 is a view illustrating a visual user interface and a tactile user interface according to an embodiment of the present specification. A digital device 10 may provide a visual user interface by displaying an object on a touch sensitive display unit. The display device 10 may display a plurality of objects including a first object 11 and a second object 12. The user can visually confirm the displayed objects, and control the corresponding objects by touching the touch sensitive display unit. The display device 10 may provide a tactile user interface, which generates tactile feedback with respect to the visual user interface. The tactile user interface may be generated in a region where the first object 11 and the second object 12 are displayed. The display device 10 may generate first tactile feedback 13 in a region where the first object 11 is displayed according to properties of the first object 11. Likewise, the display device 10 may generate second tactile feedback 14 in a region where the second object 12 is displayed according to properties of the second object 12. Here, properties of the object may include at least one of color, texture, weight, pattern, and brightness of the displayed object. The display device 10 may generate different tactile feedback with respect to respective objects having different properties. For example, in FIG. 1, assuming that the first object 11 and the second object 12 have different textures, the first tactile feedback 13 and the second tactile feedback 14 may be different from each other.

The display device 10 may additionally generate tactile feedback corresponding to friction between the displayed first object 11 and the user's finger. Assuming that a background image is displayed and the first object 11 is displayed on the background image, the display device 10 may generate the first tactile feedback 13 according to properties of the first object 11 and properties of the background image.

The display device 10 may detect pressure of a user touch gesture of touching and pushing the display unit. The display device 10 may control the intensity of tactile feedback in proportion to the pressure of the touch gesture. As such, the user can perceive that the user touches the display unit with how strong pressure. The display device 10 may detect the pressure of the touch gesture using a piezoelectric sensor or based on a detection area of the touch gesture.

Figure 2:
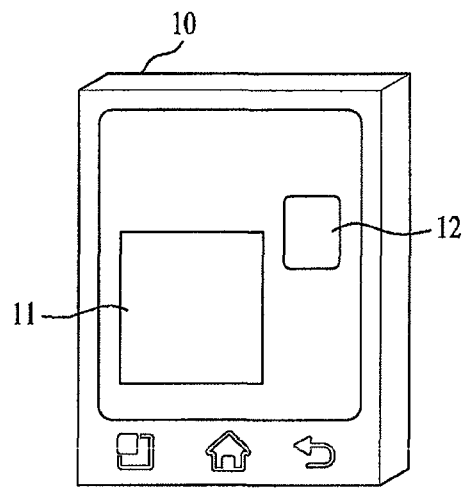
FIG. 2 is a view illustrating movement of a tactile feedback region depending on movement of an object according to an embodiment of the present specification.
Figure 2:
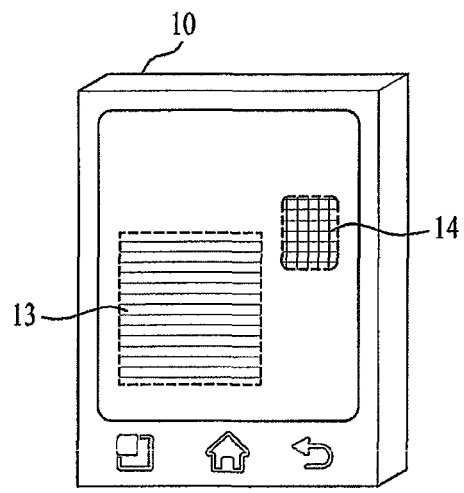
Figure 2:
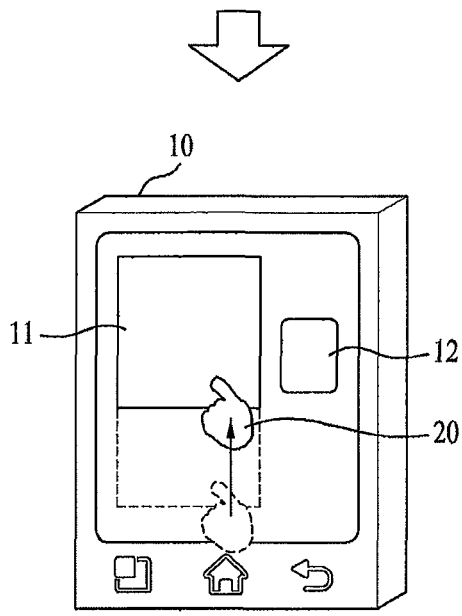
Figure 2:
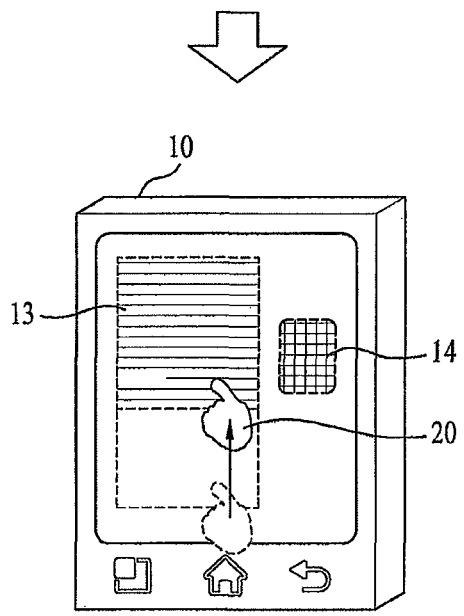

FIG. 2 is a view illustrating movement of a tactile feedback region depending on movement of an object according to an embodiment of the present specification. If a displayed object is moved by a user touch gesture, the display device may simultaneously move a tactile feedback region that is generated with respect to the corresponding object according to movement of the object. As illustrated in the upper side of FIG. 2, the display device 10 may display the first object 11 and the second object 12 as visual user interfaces. Additionally, the display device 10 may generate the first tactile feedback 13 with respect to the first object 11 and the second tactile feedback 14 with respect to the second object 12, to provide the user with tactile user interfaces. Each tactile feedback may be generated in a region where the corresponding object is displayed. As illustrated in the lower side of FIG. 2, if the user touches and drags the first object 11 to a position as represented by reference numeral 20, the display device 10 may move the first object 11 so as to display the first object 11 at the position 20. The display device 10 may also move the first tactile feedback 13 with respect to the first object 11 simultaneously with movement of the first object 11. In this case, the first tactile feedback 13 may be generated in a region where the first object 11 is displayed.

The display device 10 may generate the first tactile feedback 13 according to properties of the first object 11. Here, properties of the first object 11, as described above with reference to FIG. 1, may include texture, pattern, and color, for example. In addition to the first tactile feedback 13, the display device 10 may further generate tactile feedback corresponding to friction between the displayed first object 11 and the user's finger. Assuming that a background image is displayed and the first object 11 is controlled on the background image, the display device 10 may further generate tactile feedback according to properties of the first object 11 and properties of the background image, in addition to the first tactile feedback 13.

The second object 12, which is not subjected to the above described touch and drag operation of the user, may be displayed at the same position without movement. Thereby, the second tactile feedback 14 with respect to the second object 12 may be generated in a region where the second object 12 is displayed without movement. In this way, the display device 10 may provide the user with continuous tactile feedback with respect to an object selected by the user even if the user moves the corresponding object.

Figure 3:
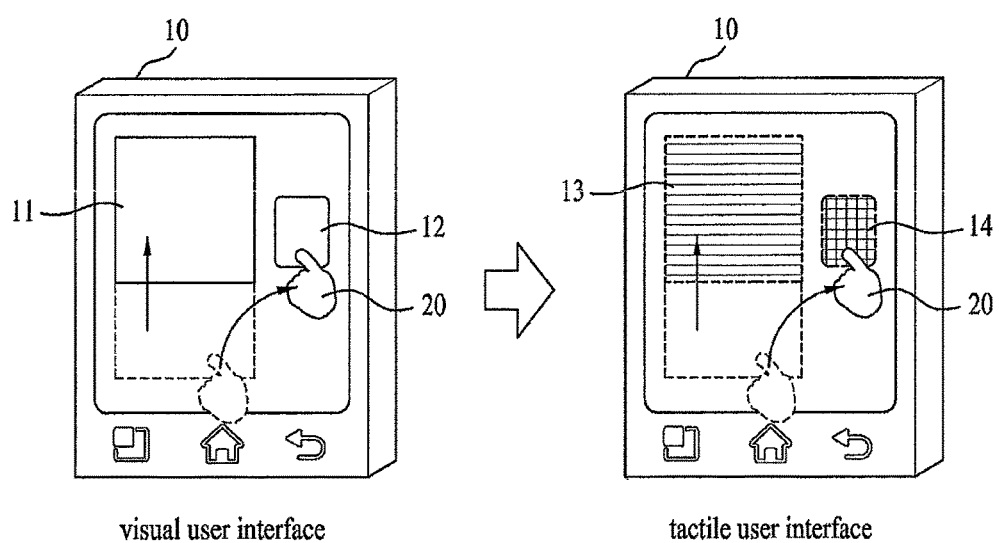
FIG. 3 is a view illustrating a method of locking a movement direction depending on movement of an object according to an embodiment of the present specification.

FIG. 3 is a view illustrating a method of locking a movement direction depending on movement of an object according to an embodiment of the present specification. The display device 10 may lock a particular movement direction of an object when moving the object in response to a user touch gesture. The user touch gesture may be divided into an X-axis component and a Y-axis component on the touch sensitive display unit. When the user touch gesture of moving the object contains a plurality of movement direction components, the display device 10 may move the object by extracting only a main movement direction component of the touch gesture. More specifically, as illustrated in FIG. 3, even if it is detected that a touch gesture 20 of moving the first object 11 has an X-axis movement direction component and a Y-axis movement direction component, the display device 10 may extract only the Y-axis movement direction component of the touch gesture 20. As a result, the display device 10 may move the first object 11 along a Y-axis in a positive direction without X-axis movement.

The display device 10 may perform locking of the particular movement direction in consideration of properties of the object. For example, in the case of a document or web-page that requires upward or downward scrolling, the display device 10 may move the object upward or downward using only the Y-axis movement direction component even if the touch gesture 20 contains the X-axis movement direction component and the Y-axis movement direction component. Likewise, in the case of a document or web-page that requires leftward or rightward scrolling, the display device 10 may move the object leftward or rightward using only the X-axis movement direction component even if the touch gesture 20 contains the X-axis movement direction component and the Y-axis movement direction component.

The display device 10 may generate tactile feedback in response to a user touch gesture of moving the object. The display device 10, as illustrated in the right side of FIG. 3, may generate tactile feedback in response to the user touch gesture 20. When the user touch gesture 20 is detected in a region of the first object 11, the display device 10 may generate the first tactile feedback 13. The display device 10 may move the region in which the first tactile feedback 13 is generated simultaneously with the first object 11 being moved by the touch gesture 20. If the user touch gesture 20 of moving the first object 11 enters a region in which the second object 12 is displayed, the display device 10 may generate the second tactile feedback 14 in the region of the second object 12. If the first object 11 and the second object 12 have different properties, the display device 10 may generate the second tactile feedback 14 different from the first tactile feedback 13 in the region of the second object 12. The user can perceive the second tactile feedback 14 via tactile sensation, and recognize that the user touch gesture 20 deviates from the region of the first object 11 and enter the region of the second object 12. In this way, the display device 10 may indicate that the user touch gesture 20 is shifted from the region of the first object 11 to the region of the second object 12.

According to an embodiment, the above described second object 12 may be a background image displayed on the display unit of the display device 10. Accordingly, even in the case in which the touch gesture 20 of moving the first object 11 deviates from the region in which the first object 11 is displayed, the display device 10 may generate tactile feedback different from the first tactile feedback 13. Even in this case, the user can perceive the tactile feedback different from the first tactile feedback 13, and recognize that the user touch gesture 20 deviates from the region of the first object 11.

Figure 4:
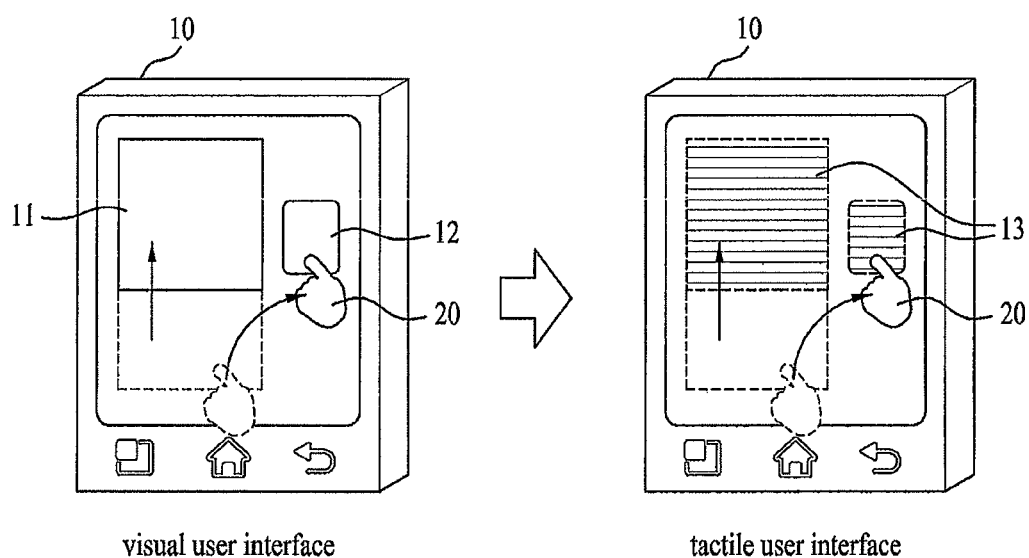
FIG. 4 is a view illustrating a method of locking tactile feedback depending on movement of an object according to an embodiment of the present specification.

FIG. 4 is a view illustrating a method of locking tactile feedback depending on movement of an object according to an embodiment of the present specification. The display device 10 may provide the user with continuous tactile feedback when controlling a displayed object in response to a user touch gesture. Specifically, the display device 10 may generate initial first tactile feedback even if a user touch gesture of touching a first region in which the first tactile feedback is generated enters a second region in which second tactile feedback is generated while maintaining contact with the touch sensitive display unit.

The display device 10, as illustrated in the left side of FIG. 4, may control a displayed object in response to a user touch gesture. Control of an object may include movement, rotation, enlargement and contraction of an object. Also, control of the object may include selection of an object, or call of a subordinate menu with respect to an object. The display device 10 may generate continuous tactile feedback in response to a user touch gesture controlling an object. The display device 10, as illustrated in the right side of FIG. 4, may generate tactile feedback in response to the user touch gesture 20. The display device 10 may generate the first tactile feedback 13 when the user touch gesture 20 is detected in the region of the first object 11.

As the first object 11 is moved by the touch gesture 20, the display device 10 may simultaneously move a region in which the first tactile feedback 13 is generated. The display device 10, as described above with reference to FIG. 3, may move the first object 11 by extracting only a vertical movement component among movement direction components of the touch gesture 20. As such, the user touch gesture 20 may deviate from the region of the first object 11 and enter the region of the second object 12.

If the touch gesture 20 of moving the first object 11 is detected in a region in which the second object 12 is displayed, the display device 10 may lock tactile feedback in response to the touch gesture 20 and generate the first tactile feedback 13 in the region of the second object 12. Even if the first object 11 and the second object 12 have different properties, the display device 10 may generate the first tactile feedback 13 instead of the second tactile feedback in the region of the second object 12. That is, as illustrated in FIG. 2, even if the second tactile feedback 14 is generated in the region of the second object 12, the display device 10 may replace the second tactile feedback 14 by the first tactile feedback 13 when the touch gesture 20 controlling the first object 11 is detected in the region of the second object 12. In this way, while the user touch gesture 20 controls the first object 11, the display device 10 may lock tactile feedback with respect to the user touch gesture 20, so as to generate the first tactile feedback 13 regardless of the region in which the touch gesture 20 is detected.

As described above, the display device 10 may indicate that an object that is under control of the user is still the first object 11 by continuously generating the first tactile feedback 13 regardless of the region in which the touch gesture 20 is detected. The user can visually confirm that the user touch gesture 20 touches the region of the second object 12, and recognize, via tactile sensation, that the user touch gesture 20 controls the first object 11 for generation of the first tactile feedback 13.

In the case in which control of a touch gesture with respect to a first object ends, the display device 10 may unlock tactile feedback that has been locked with respect to the corresponding touch gesture. The display device 10 may detect motion that the user's hand leaves the touch sensitive display unit as the end of the touch gesture controlling the first object. As such, if the user touch gesture controlling the first object ends as the user's hand leaves the region of the second object 12 and thereafter the user's hand again touches the region of the second region 12, the display device 10 may generate second tactile feedback rather than first tactile feedback that has been locked in the corresponding region. Note that the display device 10 may set a time threshold. If the user again touches the region of the second object within the time threshold after the user's hand leaves from the region of the second object, the display device 10 may continuously lock tactile feedback so as to generate the first tactile feedback in the region of the second object.

The display device 10 may also unlock tactile feedback that has been locked in the case in which a distance between a position where a touch gesture is detected and a first object exceeds a preset distance threshold. The display device 10 may unlock tactile feedback that has been locked if the touch gesture controlling the first object is detected in a region exceeding the distance threshold from the first object. Additionally, even in the case in which the user moves the user's finger that is touching the first object to a position spaced apart from the first object by more than the distance threshold while maintaining contact with the display unit, the display device 10 may unlock the tactile feedback that has been locked. Once the tactile feedback has been unlocked, the display device 10 may generate tactile feedback according to properties of the object displayed in the region in which the touch gesture is detected.

According to an embodiment, the above described second object may be a background image displayed on the display unit of the display device 10. Accordingly, the display device 10 may generate the first tactile feedback even in the case in which the touch gesture of moving the first object deviates from the region in which the first object is displayed. Even in this case, the user may continuously perceive the first tactile feedback and recognize that the user touch gesture continuously controls the first object although the touch gesture deviates from the region of the first object.

The display device 10, as described above, may lock tactile feedback between a plurality of objects or between an object and a background image. The embodiment of the present specification may be applied even in the case in which a plurality of feedback is generated within a single object. For example, a first region and a second region for generating first tactile feedback and second tactile feedback respectively may be present within a first object. As described above, in the case in which a touch gesture of touching the first region enters the second region while controlling the first region, the display device 10 may lock tactile feedback in response to the corresponding touch gesture so as to continuously generate the first tactile feedback. In this way, the display device 10 may generate the first tactile feedback in the second region in response to the touch gesture.

Figure 5:
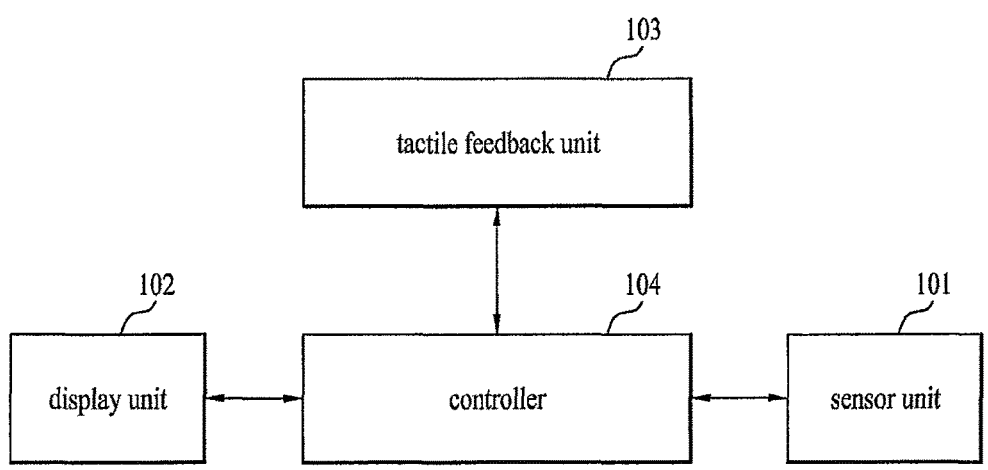
FIG. 5 is a block diagram illustrating a display device according to an embodiment of the present specification.

FIG. 5 is a block diagram illustrating a display device according to an embodiment of the present specification. In FIG. 5, the display device may include a sensor unit 101, a display unit 102, a tactile feedback unit 103, and a controller 104.

The sensor unit 101 may transmit a user input or an environment recognized by the display device to the controller 104 using a plurality of sensors equipped in the display device. The sensor unit 101 may include a plurality of sensing means. In an embodiment, the plurality of sensing means may include a piezoelectric sensor, a video sensor, and a touch sensor, for example. In the present specification, the piezoelectric sensor and the touch sensor may detect a user tough gesture. The display device may determine a position on the display unit where the touch gesture is detected using the sensor unit 101. The display device may provide tactile feedback at a position or region in which the touch gesture is detected. The sensor unit 101 is a generic term of the aforementioned various sensing means, and may detect touch gestures having various properties and transmit the sensed results to the controller 104, so as to allow the display device to perform a corresponding operation. The aforementioned sensors may be embodied into separate elements included in the display device, or may be combined to constitute at least one element included in the display device.

The display unit 102 may output an image on a display screen. The display unit 102 may serve as the above described touch sensor under the assumption that the display unit 102 is of a touch sensitive display type. Accordingly, the display unit 102 may detect a touch gesture thereto, and transmit the touch gesture to the controller 104. The display unit 102 may serve to display a visual user interface on a display panel, or to control display of an image. In the present specification, the display unit 102 may display a visual user interface, and detect a user touch gesture. Also, the display unit 102 may provide the user with tactile feedback in conjunction with the tactile feedback unit 103 that will be described hereinafter. The display unit 102 may include a flexible display.

The tactile feedback unit 103 may provide a tactile user interface. The tactile feedback unit 103 may provide a tactile user interface corresponding to the visual user interface provided by the display unit 102. The tactile feedback unit 103 may generate different tactile feedback according to properties of a displayed object. The properties of the object may include at least one of color, texture, weight, pattern and brightness.

A method of providing the user with the tactile user interface using the tactile feedback unit 103 is as follows. Tactile feedback may be provided with respect to the user's finger or a stylus that touches the display unit 102 using a minutely vibrating actuator. The tactile feedback unit 103 may adjust the frequency and magnitude of vibration, thereby adjusting friction between the user's finger and the display unit 102. Additionally, the tactile feedback unit 103 may provide the user with tactile feedback by applying a fine current to the display unit 102. The tactile feedback unit 103 may adjust the strength and generation period of current, which may provide the user with different tactile sensations. The tactile feedback unit 103 may provide tactile feedback using ultrasonic resonance. The tactile feedback unit 103 may provide the user with tactile feedback by generating ultrasonic wave plural times and causing resonation of the ultrasonic waves within a specific range. The tactile feedback unit 103 may provide different tactile feedback by adjusting the magnitude of resonance frequency and the resonance generation period of the frequency.

The controller 104 may control the above described units of the display device 10, and manage data transmission/reception between the units. In the present specification, the controller 104 may determine whether or not to lock tactile feedback in response to a touch gesture based on positions where an object to be controlled by a user touch gesture and the touch gesture are detected, or based on continuity of the touch gesture. For example, the controller 104 may provide first tactile feedback in response to a touch gesture that is detected in the region in which a first object is displayed. The first tactile feedback may be generated according to properties of the first object. If the touch gesture is dragging the first object to a region where a second object or a background image is displayed while controlling the first object, the controller 104 may lock the tactile feedback in response to the corresponding touch gesture. That is, even if the first object is detected at the outside of a region in which the first object is initially displayed while the touch gesture controls the first object, the controller 104 may generate the first tactile feedback in a region in which the touch gesture is detected. The controller 104 may continuously lock the tactile feedback while the user's finger comes into contact with the display unit via the touch gesture. The controller 104 may unlock the tactile feedback with respect to the touch gesture if contact between the touch gesture and the display unit ends. In other words, unlocking of the tactile feedback may be permitted only when the user's hand leaves the touch sensitive display unit 102.

In the present specification, the controller 104 may activate the touch sensitive display unit 102 to detect a user touch gesture. In this case, the touch sensitive display unit 102 may do not provide a visual user interface, but provide a tactile user interface. Additionally, to detect the user touch gesture, the controller 104 may activate a touch sensor, a piezoelectric sensor, or a pressure sensor of the sensor unit 101 instead of the touch sensitive display unit 102.

FIG. 5 is a block diagram according to the embodiment of the present specification, and separately displayed blocks represent logically distinguished elements of the device. Accordingly, the elements of the above described device may be mounted in a single chip or in a plurality of chips according to a device design.

Figure 6:
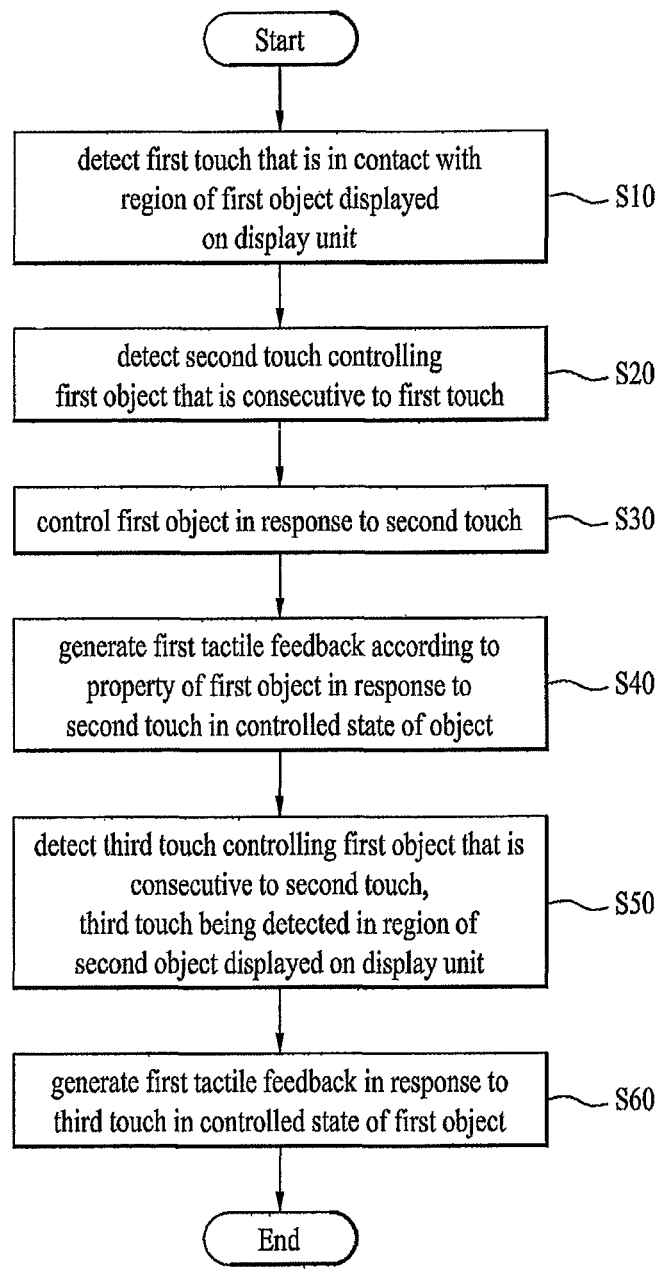
FIG. 6 is a view illustrating a method of providing continuous tactile feedback in response to a touch gesture controlling an object according to an embodiment of the present specification.

FIG. 6 is a view illustrating a method of providing continuous tactile feedback in response to a touch gesture to control an object according to an embodiment of the present specification.

The display device may detect a first touch of touching a region of a first object displayed on the display unit (S10). The first object may be displayed on the display unit to assist the user in visually confirming the first object. The user may touch the region in which the first object is displayed, in order to control the first object.

The display device may detect a second touch controlling the first object that is consecutive to the first touch (S20). The second touch may be a consecutive touch gesture of the first touch. Here, the consecutive touch gesture, as described above with reference to FIG. 4, may indicate a touch gesture that is input while contact between the user's finger and the display unit is maintained, or a touch gesture detected within a preset time threshold after a previous touch gesture ends even if contact between the user's finger and the display unit is not maintained. The display device may detect the second touch controlling the first object. The second touch may control the first object to move or rotate the first object. Additionally, the second touch may include motion to enlarge or contract the first object.

The display device may control the first object in response to the second touch (S30). The display device may control the first object in response to the detected second touch. The first object may be moved or rotated on the display unit by the second touch. Additionally, the first object may be enlarged or contracted by the second touch.

The display device may generate first tactile feedback according to properties of the first object in response to the second touch in a controlled state of the object (S40). The display device may generate the first tactile feedback according to properties of the first object using the tactile feedback unit. The tactile feedback unit, as described above with reference to FIG. 5, may generate the first tactile feedback in response to the second touch using ultrasonic vibration, fine current or ultrasonic resonance. The user may recognize that the first object is under control of the user by perceiving the first tactile feedback. That is, the display device may display that the first object is under control using the display unit, and may generate the first tactile feedback representing that the first object is under control using the tactile feedback unit. The display device may generate the first tactile feedback according to properties of the first object. The display device may generate the first tactile feedback in consideration of at least one of texture, pattern, shape, size, intensity and brightness of the displayed first object.

The display device may generate additional tactile feedback according to properties of a background image. The display device may generate the additional tactile feedback in consideration of properties of the background image and the first object together. For example, the display device may generate not only first tactile feedback tactile feedback, but also additional tactile feedback corresponding to friction in consideration of textures of the background image and the first object.

The display device may generate additional tactile feedback corresponding to friction between the first object and the user's finger. The display device may determine the magnitude of friction between the first object and the user's finger according to texture of the first object, and generate additional tactile feedback in addition to the first tactile feedback.

The display device may detect a third touch controlling the first object that is consecutive to the second touch (S50). In this case, the third touch may be detected in a region of a second object displayed on the display unit. The user touch gesture, as described above with reference to FIG. 4, may deviate from the region in which the first object is displayed and enter the region in which the second object is displayed while continuously controlling the first object. If the touch gesture controlling the first object is detected in the region in which the second object is displayed, the display device may recognize the touch gesture as a third touch. As described above with reference to FIG. 4, the third touch may be a touch gesture that is input that is consecutive to the second touch in a state in which contact between the user's finger and the display unit is maintained. The third touch may indicate a touch gesture detected within a preset time threshold after the second touch ends although the user's finger does not continuously touch the display unit.

The display device may generate the first tactile feedback in response to the third touch in a controlled state of the object (S60). The display device, as described above with reference to FIG. 4, may lock tactile feedback while an object is controlled. Accordingly, the display device may generate the first tactile feedback in response to the third touch controlling the first object. The display device may generate the first tactile feedback regardless of a region or position where the third touch is detected while the first object is controlled by the third touch. In an alternative embodiment, the display device may generate the first tactile feedback until contact between the user's finger and the display unit by the third touch is released.

The display device may unlock the first tactile feedback that has been locked if control of the first object by the third touch ends. In an alternative embodiment, the display device may unlock the tactile feedback that has been locked until contact between the user's finger and the display unit by the third touch is released. The display device may unlock the tactile feedback that has been locked even when the third touch is detected at a position exceeding a preset distance threshold from the first object. Once the tactile feedback has been unlocked, the display device may generate tactile feedback according to properties of an object or a background image displayed in the region in which the user touch gesture is detected.

Figure 7:
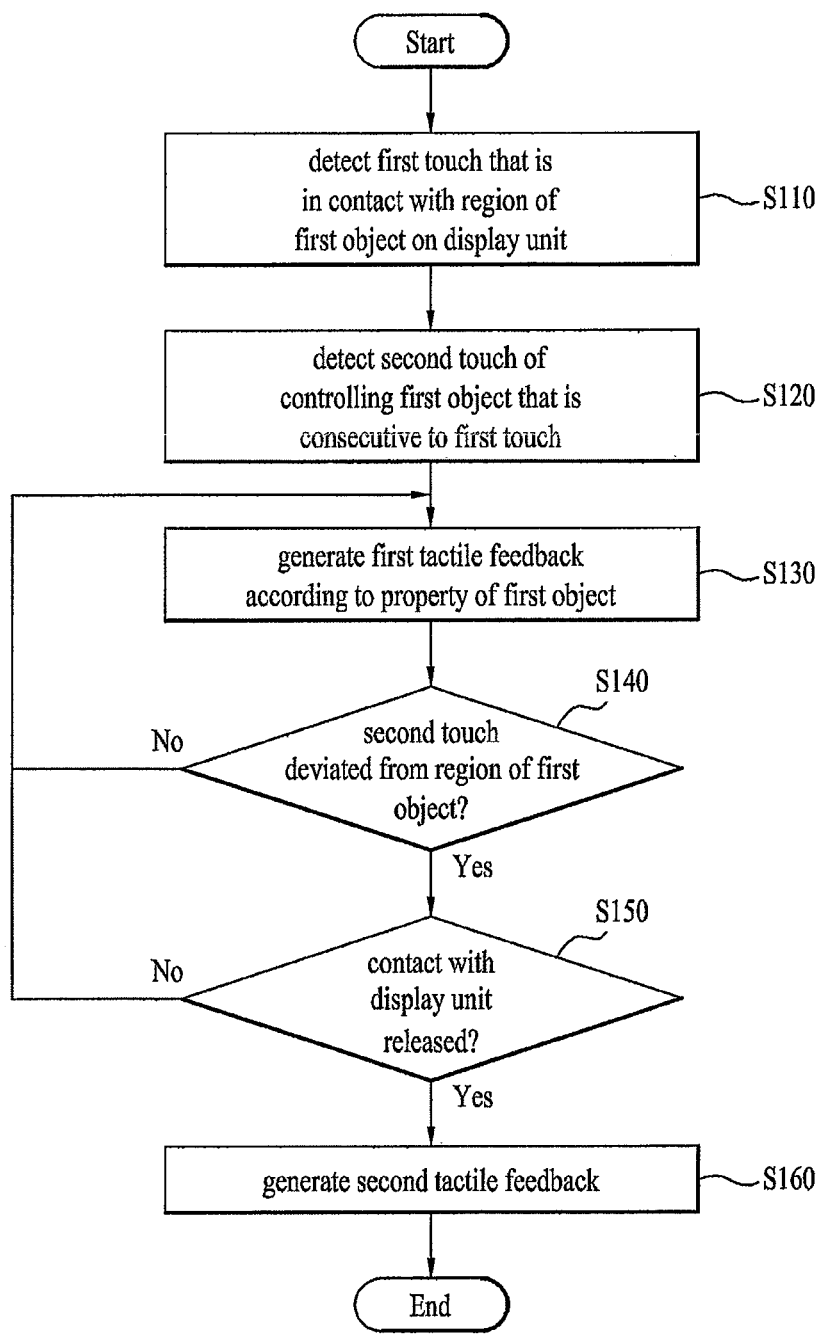
FIG. 7 is a view illustrating a method of providing continuous tactile feedback in response to a touch gesture controlling an object according to another embodiment of the present specification.

FIG. 7 is a view illustrating a method of providing continuous tactile feedback in response to a touch gesture to control an object according to another embodiment of the present specification.

The display device may detect a first touch of touching a region of a first object displayed on the display unit (S110). The first object may be displayed on the display unit to assist the user in visually confirming the first object. The user may touch the region in which the first object is displayed, in order to control the first object.

The display device may detect a second touch controlling the first object that is consecutive to the first touch, and control the first object in response to the first touch (S120). The second touch may be a consecutive touch gesture of the first touch. Here, the consecutive touch gesture, as described above with reference to FIG. 4, may indicate a touch gesture that is input while contact between the user's finger and the display unit is maintained, or a touch gesture detected within a preset time threshold after a previous touch gesture ends even if contact between the user's finger and display unit is not maintained. The display device may detect a second touch controlling the first object. The second touch may control the first object to move or rotate the first object. Additionally, the second touch may include motion to enlarge or contract the first object.

The display device may control the first object in response to the detected second touch. The first object may be moved or rotated on the display unit by the second touch. Additionally, the first object may be enlarged or contracted by the second touch.

The display device may generate first tactile feedback according to properties of the first object in response to the second touch in a controlled state of the object (S130). The display device may generate the first tactile feedback according to properties of the first object using the tactile feedback unit. The tactile feedback unit, as described above with reference to FIG. 5, may generate the first tactile feedback in response to the second touch using ultrasonic vibration, fine current or ultrasonic resonance. The user may recognize that the first object is under control of the user by perceiving the first tactile feedback. That is, the display device may display that the first object is under control using the display unit, and may generate the first tactile feedback representing that the first object is under control using the tactile feedback unit. The display device may generate the first tactile feedback according to properties of the first object. The display device may generate the first tactile feedback in consideration of at least one of texture, pattern, shape, size, intensity and brightness of the displayed first object.

The display device may generate additional tactile feedback according to properties of a background image. The display device may generate the additional tactile feedback in consideration of properties of the background image and the first object. For example, in addition to the first tactile feedback, the display device may generate tactile feedback corresponding to friction in consideration of textures of the background image and the first object.

The display device may generate additional tactile feedback corresponding to friction between the first object and the user's finger. The display device may determine the magnitude of friction between the first object and the user's finger according to texture of the first object to generate the tactile feedback in addition to the first tactile feedback.

The display device may judge whether or not the second touch deviates from the region of the first object (S140). The user touch gesture, as described above with reference to FIG. 4, may deviate from the region in which the first object is displayed while controlling the first object. The display device may generate the first tactile feedback if the second touch does not deviate from the region of the first object.

The display device may judge whether or not contact between the second touch and the display unit is released if the second touch deviates from the region of the first object (S150). The display device, as described above with reference to FIG. 4, may lock the first tactile feedback in response to the second touch while contact between the second touch and the display unit is maintained. The display device may generate the first tactile feedback regardless of the region in which the second touch is detected if contact between the second touch and the display unit is not released.

The display device may generate second tactile feedback if contact between the second touch and the display unit is released (S160). As described above with reference to FIG. 5, the second tactile feedback may be different from the first tactile feedback. The display device may generate the second tactile feedback according to properties of an object or a background image located in a region where the second touch is detected. The display device may generate the second tactile feedback in consideration of at least one of texture, pattern, shape, size, intensity and brightness of the object or the background image in the region in which the displayed second touch is detected.

Figure 8:
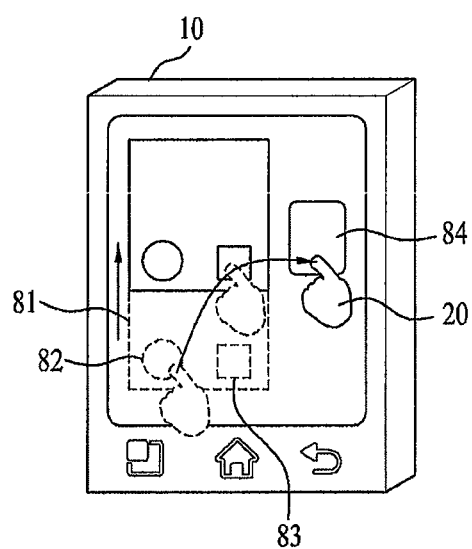
FIG. 8 is a view illustrating a method of locking tactile feedback depending on movement of an object or sub-object according to an embodiment of the present specification.

FIG. 8 is a view illustrating a method of locking tactile feedback depending on movement to an object according to an embodiment of the present specification. The display device may provide the user with continuous tactile feedback when controlling a displayed object in response to a user control input. Specifically, the display device may generate tactile feedback corresponding to an object to be controlled by a user control input. In addition, while the object is under control of the user, the display device may maintain the tactile feedback with respect to the object that is under control of the user even if the user control input is detected in a region where another object is displayed.

As illustrated in FIG. 8, the display device may control a displayed object according to a user control input. Here, control of the object may include movement, rotation, enlargement, and contraction of the object. In addition, control of the object may include selection of the object, or call of a subordinate menu with respect to the object. In this way, the display device may generate continuous tactile feedback in response to the user control input controlling the corresponding object.

In FIG. 8, a first object 81 may include a first sub-object 82 and a second sub-object 83. Here, the first object 81, the first sub-object 82, and the second sub-object 83 may correspond to different tactile feedback respectively. That is, the display device 10 may generate first tactile feedback in a region where the first object 81 is displayed, second tactile feedback in a region where the first sub-object 82 is displayed, and third tactile feedback in a region where the second sub-object 83 is displayed. In addition, the display device 10 may display a second object 84, and may generate fourth tactile feedback in a region where the second object 84 is displayed. Accordingly, the user can perceive different tactile feedback in the respective regions, and recognize which of the respective regions is touched by the user. The first sub-object 82 and the second sub-object 83 are included in the first object 81, and therefore may be controlled together when the user controls the first object 81.

In FIG. 8, the user may control the first object 81 by touching the region where the first sub-object 82 is displayed. The display device 10 may set the first object 81 so as to move upward or downward. If the user moves a control input right upward, the display device 10 may move the first object 81 upward. Accordingly, for example, as the user control input is moved, the display device 10 may sequentially detect the user control input in the region where the first sub-object 82 is displayed, in the region where the first object 81 is displayed, in the region where the second sub-object 83 is displayed, in the region where the first object 81 is displayed, and in the region where the second object 84 is displayed. In addition, the display device 10 may generate tactile feedback corresponding to a position where the user control input is detected. That is, the display device may generate, in response to the user control input, the second tactile feedback, the first tactile feedback, the third tactile feedback, the first tactile feedback, and the fourth tactile feedback in this sequence.

In another embodiment, the display device, as described above with reference to FIG. 4, may lock tactile feedback. The display device may generate tactile feedback corresponding to each region when a user control input, which is moved within a region in which a first object is displayed, is detected in the corresponding region. That is, if the user control input is sequentially detected in a region where a first sub-object is displayed, in the region where the first object is displayed, and in a region where a second sub-object is displayed, the display device may sequentially generate second tactile feedback, first tactile feedback, and third tactile feedback in the respective regions where the user control input is detected. In other words, the display device may generate tactile feedback corresponding to each region where the user control input is detected if the user control input is moved within the first object that is under control of the user.

The display device may lock tactile feedback if the user control input is detected in a region where a second object is displayed while the first object is under control of the user. More specifically, the display device may generate the tactile feedback corresponding to any one sub-object included in the first object if the user control input is detected in the region where the second object is detected while the first object is under control of the user. If the first object contains a plurality of sub-objects, the display device may generate tactile feedback corresponding to the last sub-object that the user control input touches within the region where the first object is displayed. For example, in FIG. 8, the display device may generate the third tactile feedback corresponding to the second sub-object if the user control input is detected in the region where the second object is displayed. This is because the second sub-object is the last sub-object that the user control input touches within the region where the first object is displayed. The above described tactile feedback locking may be applied in the case in which the user control input is detected in the region where the second object is displayed at or after a preset time threshold after the user control unit is detected in the region where the first object is displayed.

In another embodiment, the display device may lock tactile feedback in response to a user control input using a time threshold. The display device may lock tactile feedback if the user control input is detected in a region where a second object is displayed while a first object is under control of the user. More specifically, the display device may generate tactile feedback corresponding to any one sub-object included in the first object if the user control input is detected in the region where the second object is displayed. In FIG. 8, if the user control input is moved from a first sub-object to the second object within a preset time threshold, the display device may generate second tactile feedback corresponding to the first sub-object in the region where the second object is displayed. That is, the display device may lock the second tactile feedback corresponding to the first sub-object that the user control input initially touches within the first object in response to the corresponding user control input. In this way, the display device may maintain the second tactile feedback corresponding to the first sub-object even if the user control input is moved to and detected in the region where the first object is displayed, in the region where the second sub-object is displayed, or in the region where the second object is displayed, rather than in the region where the first sub-object is displayed, within the time threshold.

As described above, the display device may indicate an object that is being controlled by the user control input by continuously generating tactile feedback corresponding to the object that is under control of the user. For example, the user may visually confirm that the user control input touches the region where the second object is displayed, and may recognize that the first object is under control of the user via tactile sensation.

FIG. 9 is a view illustrating a method of generating non-contact tactile feedback according to an embodiment of the present specification. A display device, designated by reference numeral 91, may generate non-contact tactile feedback by detecting a user control input. Here, the user control input may include user motion including hand motion, user views, and a control input using a control device. In addition, the display device may transmit tactile feedback to the user using a magnetic field, compressed air, ultrasound wave, vibration, and wearable tactile device even if the user does not directly touch the display device. The display device may include an airborne ultrasound tactile display. Accordingly, the display device may transmit tactile feedback by applying acoustic radiation pressure to the back of the user's hand using airborne ultrasound tactile feedback. In the following description, an embodiment in which the display device perceives user hand motion and provides the user with tactile feedback using ultrasound wave will be described.

The display device 91 may generate tactile feedback by detecting a control input of a user 90. The display device 91 may display a first object 92 and a second object 93, and may detect the control input of the user 90 controlling the first and second objects 92 and 93. If the first object 92 is under control of the user 90, i.e. if the user's hand 20 is present in a first region 94 corresponding to the first object 92, the display device 91 may generate first tactile feedback in the first region 94. If the user's hand 20 is detected in a second region 95 corresponding to the second object 93 while the first object 92 is under control of the user, the display device may lock the first tactile feedback. That is, the display device may generate the first tactile feedback corresponding to the first object 92 in a region where the user's hand 20 is located while the first object 92 is under control of the user 90. In this way, it is possible to provide the user with the first tactile feedback even if the user control input is moved to the second region 95 corresponding to the second object 93 while the first object 92 is under control of the user 90.

The display device may generate airborne ultrasound tactile feedback at a position where the user's hand 20 is located. If the user control input takes the form of user views or a control input using a control device, the display device may generate first tactile feedback in other body parts except for the user's hand or in the control device. In addition, the display device, as described above, may transfer tactile feedback by ejecting compressed air to the user or by transmitting a signal to a tactile device.

FIG. 10 is a flowchart illustrating a method of generating non-contact tactile feedback according to an embodiment of the present specification. The display device may be operated upon receiving a user control input. The user control input may include at least one of a touch input, a gesture input, a sound input, and a signal input. The display device may detect a first control input of selecting a first object displayed on the display unit (S210). The user may visually confirm the first object because the first object is displayed on the display unit. The user may select the first object in order to control the first object.

Next, the display device may detect a second control input controlling the first object, which is consecutive to the first control input (S220), and may control the first object in response to the second control input (S230). The second control input may be a control input consecutive to the first control input. Here, the consecutive control input may refer to a next control input that is detected within a preset time threshold after a previous control input ends, as described above with reference to FIG. 4. In this way, the display device may detect the second control input controlling the first object. The second control input may serve to move or rotate the first object. In addition, the second control input may include enlargement or contraction of the first object. The display device may control the first object in response to the detected second control input. Thereby, the first object may be moved or rotated on the display unit in response to the second control input. In addition, the first object may be enlarged or contracted in size in response to the second control input.

Next, the display device may generate first tactile feedback according to properties of the first object in response to the second control input as the first object is under control of the user (S240). The display device may generate the first tactile feedback according to properties of the first object using the tactile feedback unit. The tactile feedback unit may generate the first tactile feedback in response to the second control input using ultrasound wave, compressed air, vibration, a wearable tactile device, or acoustic radiation pressure as described above with reference to FIGS. 5 and 9. The user may recognize that the first object is under control of the user by sensing the first tactile feedback. That is, the display device may display that the first object is under control of the user using the display unit, and may generate the first tactile feedback representing that the first object is under control of the user using the tactile feedback unit. The display device may generate the first tactile feedback according to properties of the first object. That is, the display device may generate the first tactile feedback according to at least one of texture, pattern, shape, size, intensity, and brightness of the displayed first object.

In addition, the display may generate additional tactile feedback according to properties of a background image. The display device may generate additional tactile feedback in consideration of properties of the background image as well as properties of the first object. For example, in addition to the first tactile feedback, the display device may generate new tactile feedback corresponding to friction between the background image and the first object in consideration of texture of the background image and texture of the first object.

Next, the display device may detect a third control input controlling the first object, which is consecutive to the second control input (S250). In this case, the third control input may be detected in a region of the display unit where a second object is displayed. The user control input may deviate from a first region corresponding to the first object and enter a second region corresponding to the second object while the first object is under control of the user, as described above with reference to FIG. 9. The display device may detect the third control input if the control input controlling the first object is detected in the second region corresponding to the second object. As described above with reference to FIG. 4, the third control input may refer to a control input detected within a preset time threshold after the second control input ends.

Next, the display device may generate the first tactile feedback in response to the third control input as the first object is under control of the user (S260). The tactile feedback unit may generate the first tactile feedback in response to the third control input using at least one of ultrasound wave, compressed air, vibration, a remote tactile device, a wearable tactile device, or acoustic radiation pressure as described above with reference to FIGS. 5 and 9. The display device may lock the tactile feedback while the first object is under control of the user, as described above with reference to FIG. 9. Accordingly, the display device may generate the first tactile feedback in response to the third control input controlling the first object. The display device may maintain the first tactile feedback in response to the third control input detected in the second region while the third control input controls the first object.

The display device may unlock the locked tactile feedback if control of the first object in response to the third control input ends. In addition, the display device may unlock the locked tactile feedback even when the third control input is detected at a position exceeding a preset distance threshold from the first region corresponding to the first object. Once the locked tactile feedback is unlocked, the display device may generate new tactile feedback according to properties of an object corresponding to a region where the user control input is detected or according to properties of a background image.

As described above, the display device may provide continuous tactile feedback in response to a user control input, thereby achieving consistent provision of tactile feedback corresponding to an object that is under control of the user.

As described above, the display device may provide continuous tactile feedback in response to a user touch gesture, thereby achieving inconsistent provision of an object to be controlled by the user and tactile feedback.

As is apparent from the above description, a display device according to the present specification may adaptively generate tactile feedback according to a control operation of the user.

Further, according to the present specification, the display device may provide preset tactile feedback changed on a per region basis.

Furthermore, according to the present specification, the display device may provide continuous tactile feedback in response to a user gesture.

In addition, according to the present specification, the display device may lock tactile feedback in response to the user gesture so as to provide constant tactile feedback while the user controls an object.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

What is claimed is:

1. A display device comprising:
    a display unit configured to display a plurality of objects including a first object and a second object on a display screen;
    a tactile feedback unit configured to generate tactile feedback on the display screen; and
    a controller configured to:
    generate a first tactile feedback, via the tactile feedback unit, according to a first touch input in a first region where the first object is displayed, wherein the first tactile feedback varies via properties of the first object including at least one of a pattern, shape, size, intensity and brightness of the displayed first object,
    detect a second touch input from the first region to a second region where a second object is displayed,
    detect a releasing of the second touch input in the second region,
    generate a second tactile feedback, via the tactile feedback unit, according to the detecting the releasing of the second touch input in the second region, wherein the second tactile feedback varies via properties of the second object including at least one of a pattern, shape, size, intensity and brightness of the displayed second object.

2. The display device according to claim 1, wherein the first tactile feedback is different than the second tactile feedback when the properties of the first object are different than the properties of the second object.

3. The display device according to claim 1, further comprising a piezoelectric sensor configured to detect the pressure of the first touch input or the second touch input.

4. The display device according to claim 1, wherein the controller is further configured to:
    recognize a detection area of the first touch input or the second touch input, and
    detect the pressure of the first touch input or the second touch input based on the recognized detection area of the first touch input or the second touch input.

5. The display device according to claim 1, wherein the tactile feedback unit is further configured to:
    apply a first fine current to the display screen for the first tactile feedback, and
    apply a second fine current to the display screen for the second tactile feedback, and
    wherein the first fine current and the second fine current have a different strength.

6. The display device according to claim 1, wherein the tactile feedback unit is further configured to:
    apply a first fine current to the display screen for the first tactile feedback, and
    apply a second fine current to the display screen for the second tactile feedback, and
    wherein the first fine current and the second fine current have a different generation period.

7. The display device according to claim 1, wherein the tactile feedback unit is further configured to:
    generate a first ultrasonic wave for the first tactile feedback, and
    generate a second ultrasonic wave for the second tactile feedback, and
    wherein the first ultrasonic wave and the second ultrasonic wave have different magnitudes of resonance frequency.

8. The display device according to claim 1, wherein the tactile feedback unit is further configured to:
    generate a first ultrasonic wave for the first tactile feedback, and
    generate a second ultrasonic wave for the second tactile feedback, and
    wherein the first ultrasonic wave and the second ultrasonic wave have different resonance generation periods of frequency.

* * * * *